(12) United States Patent
Fukuda (10) Patent No.: US 8,958,023 B2
(45) Date of Patent: Feb. 17, 2015

(54) LIQUID CRYSTAL MODULE

(75) Inventor: Yutaka Fukuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 131 days.

(21) Appl. No.: 13/357,491

(22) Filed: Jan. 24, 2012

(65) Prior Publication Data

US 2012/0194760 A1     Aug. 2, 2012

(30) Foreign Application Priority Data

Jan. 28, 2011   (JP) .................................. 2011-015959

(51) Int. Cl.
   *G02F 1/1333* (2006.01)
(52) U.S. Cl.
   CPC .................. *G02F 1/133308* (2013.01); *G02F 2001/133317* (2013.01); *G02F 2001/133322* (2013.01); *G02F 2001/133325* (2013.01)
   USPC .......................................................... 349/58
(58) Field of Classification Search
   USPC .......................................................... 349/58
   See application file for complete search history.

(56) References Cited

U.S. PATENT DOCUMENTS

| | | | |
|---|---|---|---|
| 7,659,948 B2* | 2/2010 | Kim | 349/58 |
| 2001/0003471 A1* | 6/2001 | Lee et al. | 349/58 |
| 2007/0171323 A1* | 7/2007 | Lin | 349/58 |
| 2008/0303979 A1* | 12/2008 | Shimizu | 349/65 |
| 2010/0277664 A1* | 11/2010 | Kim et al. | 349/58 |

FOREIGN PATENT DOCUMENTS

| | | |
|---|---|---|
| JP | 2002-258249 A | 9/2002 |
| JP | 2003-162232 A | 6/2003 |
| JP | 2008-204797 A | 9/2008 |
| JP | 2008-305576 A | 12/2008 |

* cited by examiner

*Primary Examiner* — Michael Caley
*Assistant Examiner* — Edmond Lau
(74) *Attorney, Agent, or Firm* — Global IP Counselors, LLP (57) ABSTRACT

A liquid crystal module includes a rear frame, a molded frame, a light guide plate, a light source, a liquid crystal pane and a positioning structure. The light source is disposed along a first end face of the light guide plate. The positioning structure positions the light guide plate relative to the rear frame. The positioning structure has an engagement portion and a drawn protrusion that engages with the engagement portion. The engagement portion is provided on a second end face of the light guide plate with the second end face being different from the first end face. The drawn protrusion is provided on the rear frame by drawing a part of the rear frame with the drawn protrusion being integrally formed with the rear frame as a one-piece, unitary member.

20 Claims, 7 Drawing Sheets

LIQUID CRYSTAL MODULE

CROSS-REFERENCE TO RELATED APPLICATIONS

This application claims priority to Japanese Patent Application No. 2011-015959 filed on Jan. 28, 2011. The entire disclosure of Japanese Patent Application No. 2011-015959 is hereby incorporated herein by reference.

BACKGROUND

1. Field of the Invention

The present invention generally relates to a liquid crystal module. More specifically, the present invention relates to an edge-lit liquid crystal module.

2. Background Information

A conventional liquid crystal module is used in flat screen television sets, personal computers, and so forth. The liquid crystal module includes a rear frame, a molded frame, a light guide plate, a light source, a liquid crystal module and a bezel. The rear frame is made of sheet metal. The molded frame is provided to four sides of the rear frame. The light source is installed along an end face of the light guide plate. The light guide plate is superposed over the rear frame. The liquid crystal panel is disposed on an upper side of the light guide plate. The liquid crystal panel is supported by a panel support component of the molded frame. Edges of the liquid crystal panel and the molded frame are surrounded by the bezel.

With the conventional liquid crystal module, concave components are formed at left and right end faces of the light guide plate, and lift-up tabs provided to a bottom panel of the rear frame are fitted into the concave components in the light guide plate, thereby positioning the light guide plate so that it will not move in a direction along either the long or short sides of the rear frame.

Furthermore, with a conventional lighting unit, concave components or convex components are formed on end faces of a light guide plate. The light guide plate is positioned by being mated with convex components or concave components formed on a frame inner face (see Japanese Laid-Open Patent Application Publication No. 2008-305576, for example). With another conventional planar light source apparatus, convex positioning components formed on end faces of a light guide plate are mated with concave components formed in a molded frame to position the light guide plate (see Japanese Laid-Open Patent Application Publication No. 2008-204797, for example). With another conventional liquid crystal device, a light guide plate is fixed between a molded frame and a frame case (see Japanese Laid-Open Patent Application Publication No. 2003-162232, for example). With further another liquid crystal display device, a light guide plate, a reflective sheet, an optical sheet, a liquid crystal display panel, and so forth are positioned with a frame provided inside of a rear housing (see Japanese Laid-Open Patent Application Publication No. 2002-258249, for example).

SUMMARY

With the conventional liquid crystal module as mentioned above, the concave components are formed in the left and right end faces of the light guide plate, and the light guide plate is positioned by mating the lift-up tabs provided to the bottom panel of the rear frame with the concave components of the light guide plate. It has been discovered that with this configuration, there are holes in the rear frame bottom panel where the lift-up tabs are formed, and that light leaks to the outside from these holes, and dust can easily find its way into the interior of the rear frame. Thus, light leakage and dust infiltration need to be prevented by affixing a light blocking tape over the holes made in the bottom panel of the rear frame. However, it has also been discovered that if the light blocking tape is affixed, then the cost of the light blocking tape and the work entailed by affixing it drive up the overall cost.

An improved liquid crystal module was conceived in light of the above-mentioned problem. One object of the present disclosure is to provide a liquid crystal module with an improved positioning structure for positioning a light guide plate relative to a frame made of sheet metal.

In accordance with one aspect of the present disclosure, a liquid crystal module includes a rear frame, a molded frame, a light guide plate, a light source, a liquid crystal pane and a positioning structure. The rear frame is made of sheet metal. The molded frame is provided around the rear frame. The molded frame has a panel support component. The light guide plate is provided within the rear frame. The light source is disposed along a first end face of the light guide plate. The liquid crystal panel is supported to the panel support component of the molded frame. The positioning structure positions the light guide plate relative to the rear frame. The positioning structure has an engagement portion and a drawn protrusion that engages with the engagement portion. The engagement portion is provided on a second end face of the light guide plate with the second end face being different from the first end face. The drawn protrusion is provided on the rear frame by drawing a part of the rear frame with the drawn protrusion being integrally formed with the rear frame as a one-piece, unitary member.

These and other objects, features, aspects and advantages will become apparent to those skilled in the art from the following detailed description, which, taken in conjunction with the annexed drawings, discloses a preferred embodiment.

BRIEF DESCRIPTION THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from these disclosures that the following descriptions of the selected embodiments are provided for illustration only and not for the purpose of limiting the invention as defined by the appended claims and their equivalents.

A liquid crystal module L pertaining to a first embodiment will now be described in detail through reference to FIGS. 1-6.

The liquid crystal module L is an edge-lit liquid crystal module that is used in flat screen liquid crystal television sets, personal computers, and the like. As shown in FIGS. 1 to 4, the liquid crystal module L includes a rear frame 1, a light guide plate 2, a molded frame 3, an optical sheet 4, a liquid crystal panel 5, a cushioning material 6, a bezel 7, clip-on-films 8A and 8B (hereinafter "COFs"), an X-substrate 9A, a Y-substrate 9B, and an LED bar 10. The rear frame 1 is made of sheet metal and has a rectangular shape in a plan-view. The light guide plate 2 is made of a transparent synthetic resin and has a rectangular shape in a plan-view. The light guide plate 2 is superposed over the rear frame 1. The molded frame 3 is made of a synthetic resin and put together in a rectangular frame shape. The molded frame 3 is provided around the four sides of the rear frame 1 and the light guide plate 2. As mentioned above, the rear frame 1 has a rectangular shape in a plan-view. Hereinafter, a direction along a long side of the rear frame 1 or the light guide plate 2 is called a long side direction (i.e., a horizontal direction of the liquid crystal module L), and a direction along a short side of the rear frame 1 or the light guide plate 2 is called a short side direction (i.e., a vertical direction of the liquid crystal module L). Thus, the long side direction is perpendicular to the short side direction.

The optical sheet 4 includes a light diffusing sheet, and the like. The optical sheet 4 suppresses uneven brightness and so forth. The optical sheet 4 is superposed over the light guide plate 2. The liquid crystal panel 5 is disposed over the optical sheet 4 with a spacing therebetween. The four sides of the liquid crystal panel 5 are supported by panel support components 3a provided at an upper end portion of the molded frame 3 via the cushioning material 6. The molded frame 3 and the four sides of the liquid crystal panel 5 are surrounded and covered by the bezel 7 that is put together in the form of a rectangular frame. The bezel 7 is made of metal.

Figure 1:
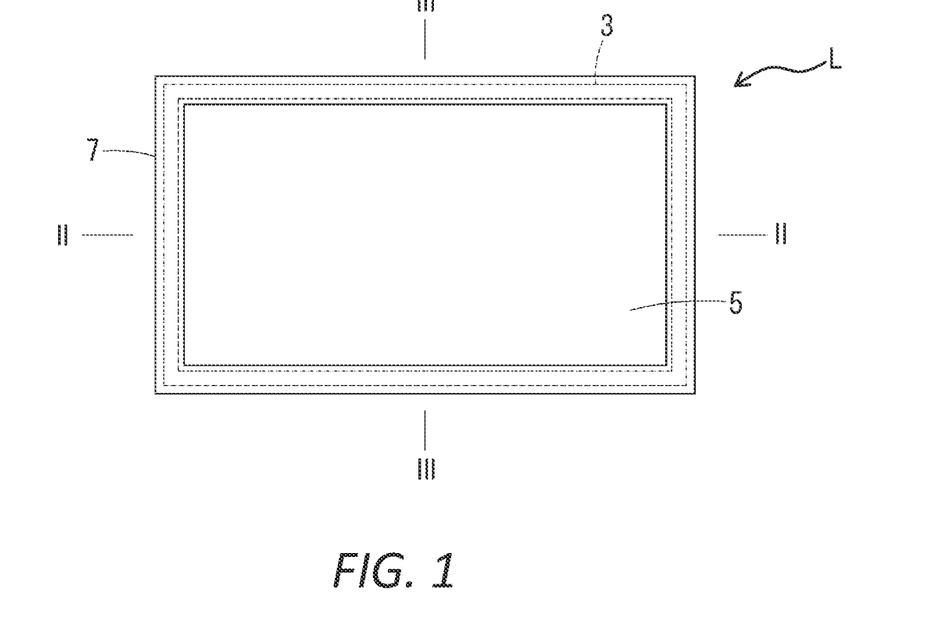
FIG. 1 is a front elevational view of a liquid crystal module in accordance with a first embodiment.
Figure 2:
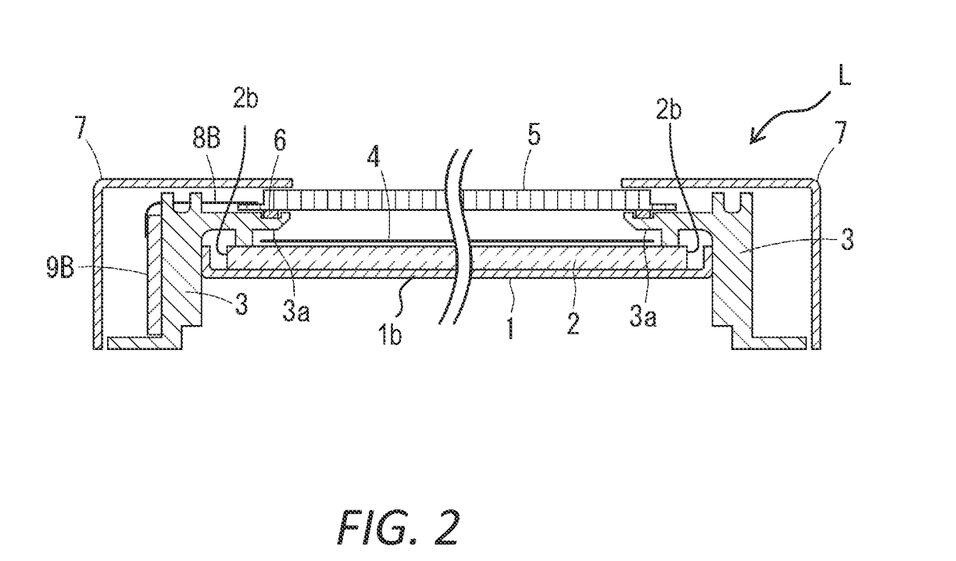
FIG. 2 is a cross sectional view of the liquid crystal module taken along II-II line in FIG. 1.
Figure 3:
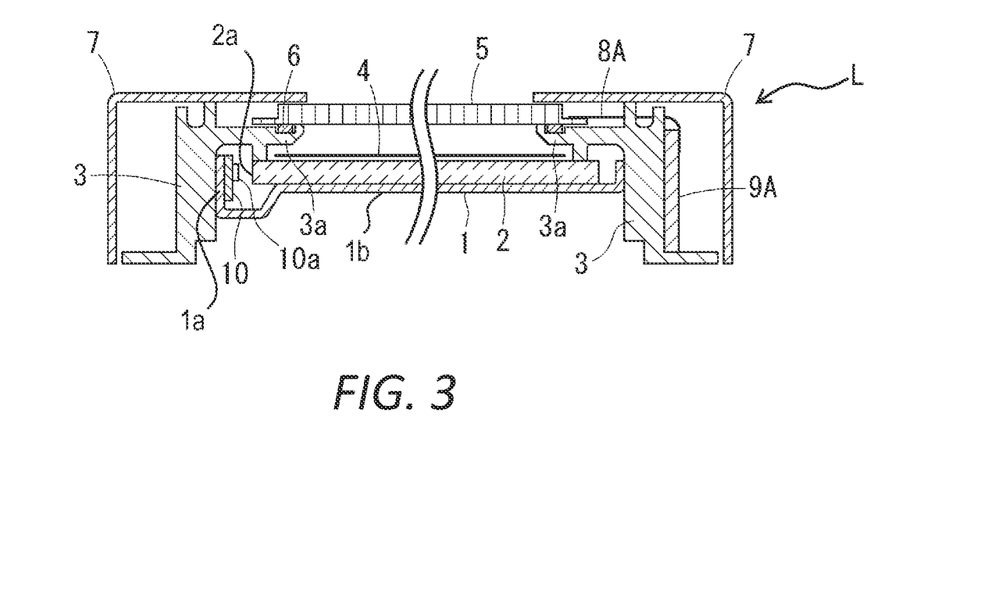
FIG. 3 is a cross sectional view of the liquid crystal module taken along III-III line in FIG. 1.

As shown in FIG. 3, the COF 8A includes or mounts a source driver IC chip. The X-substrate 9A is electrically connected via the COF 8A to an upper side of the liquid crystal panel 5. The X-substrate 9A is attached to an outer face of the molded frame 3. Also, as shown in FIG. 2, the COF 8B also includes or mounts a source driver IC chip. The Y-substrate 9B is electrically connected via the COF 8B to a left side of the liquid crystal panel 5. The Y-substrate 9B is also attached to the outer face of the molded frame 3. The X-substrate 9A can be connected to a lower side of the liquid crystal panel 5 via the COF 8A. The Y-substrate 9B can be connected to a right side of the liquid crystal panel 5 via the COF 8B.

Figure 4:
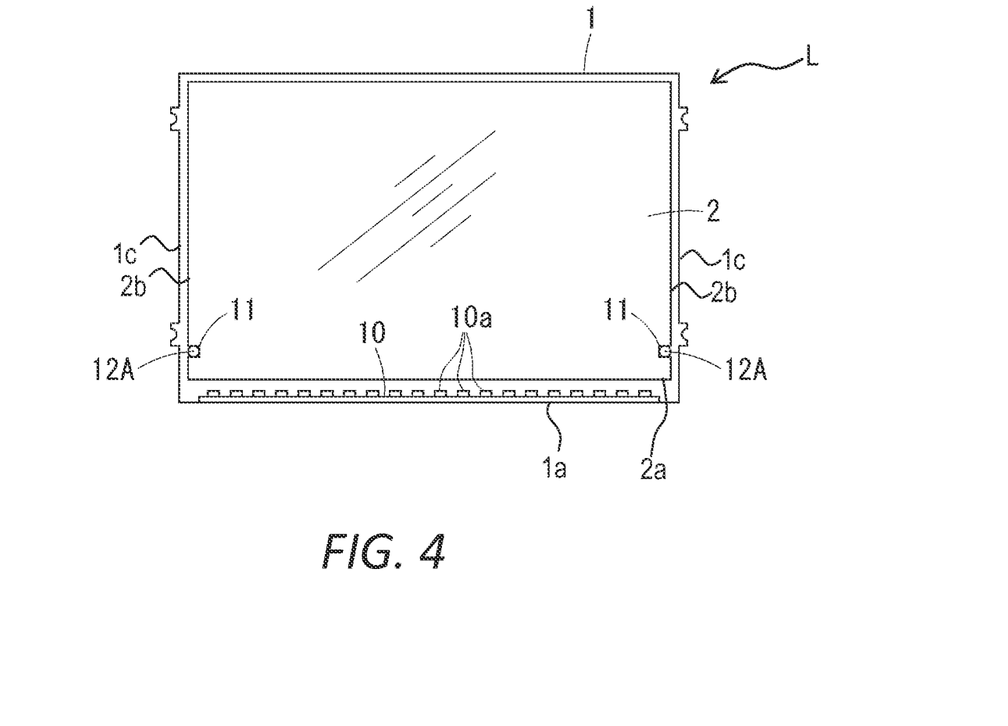
FIG. 4 is a front elevational view of a rear frame and a light guide plate of the liquid crystal module illustrated in FIG. 1.

As shown in FIGS. 3 and 4, the LED bar 10 has a plurality of LEDs 10a as a light source. The LEDs 10a are arranged on the LED bar 10 in a row with a specific spacing therebetween. Specifically, the LEDs 10a are mounted on a slender substrate to form the LED bar 10. The LED bar 10 is attached to an inner face of a lower side panel 1a formed on a lower side of the rear frame 1. The LEDs 10a are arranged along a lower end face 2a first end face) on the lower side of the light guide plate 2 with a specific gap maintained in between them in the short side direction of the rear frame 1. Therefore, the light emitted from the LEDs 10a enters the lower end face 2a on the lower side of the light guide plate 2 with almost no loss, and exits the front surface of the light guide plate 2 as planar emission. Furthermore, the light goes through the optical sheet 4, and shines uniformly on the liquid crystal panel 5 from behind. The light guide plate 2 has a reflective film. The reflective film is formed on the rear surface of the light guide plate 2 such that the light that is to be emitted from the rear face will be reflected to the front surface of the light guide plate 2.

Additionally or alternatively, the LED bar 10 can be configured such that the LEDs 10a are arranged along an upper end face on an upper side of the light guide plate 2 by attaching them to an upper side panel formed at an upper side of the rear frame 1. Furthermore, the LED bar 10 can be configured such that the LEDs 10a are arranged along the upper and lower end faces at both the upper and lower sides of the light guide plate 2 by attaching them to the upper and lower side panels formed at the upper and lower sides of the rear frame 1. Also, instead of the LED bar 10, a cold cathode tube or other such linear light source can be provided along one or both end faces at the upper and lower sides of the light guide plate 2.

Figure 5:
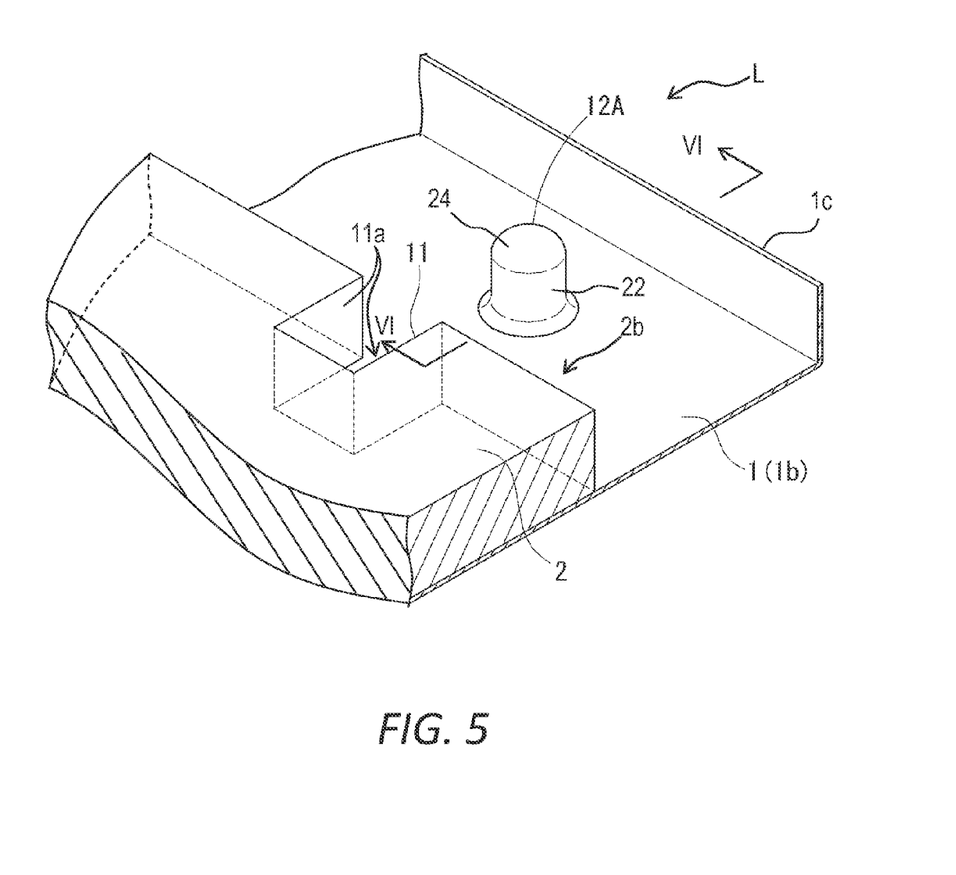
FIG. 5 is an enlarged, exploded perspective view of a positioning portion of the rear frame and the light guide plate of the liquid crystal module illustrated in FIG. 1.
Figure 6:
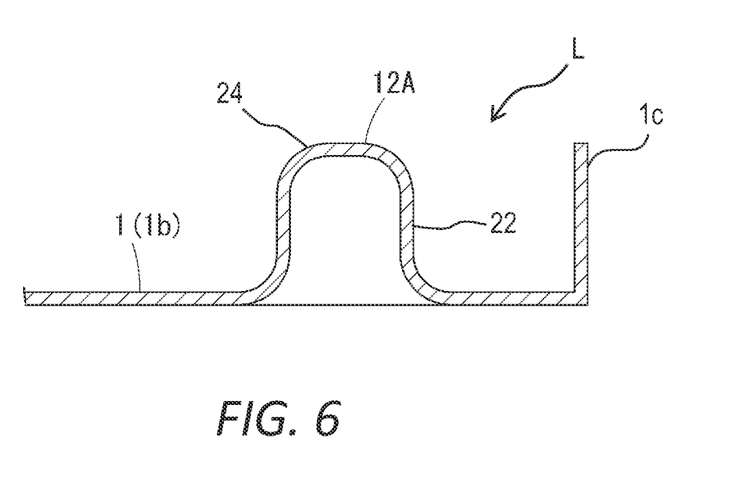
FIG. 6 is a partial cross sectional view of the rear frame of the liquid crystal module taken along VI-VI line in FIG. 5.

As shown in FIG. 4, the light guide plate 2 is positioned relative to the rear frame 1 at lower parts of both the left and right sides of the light guide plate 2 such that it does not move in either the long or short side direction of the rear frame 1. Specifically, the liquid crystal module L includes a positioning portion (positioning structure) positioning the light guide plate 2 relative to the rear frame 1. The positioning portion includes a pair of concave components 11 (e.g., engagement portions or notches) and a pair of bulging convex components 12A (e.g., drawn protrusions). As shown in FIG. 5, each of the concave components 11 includes a substantially square cutout with a pair of opposite inner faces 11a. The concave components 11 are formed at lower parts of left and right end faces 2b (e.g., second end faces) of the light guide plate 2, respectively. The left and right end faces 2b are a surface that does not face the LED bar 10 and where the LED bar 10 is not installed, and are different from the lower end face 2a that faces the LED bar 10. The bulging convex components 12A engage with the concave components 11, respectively. The bulging convex components 12A are located at locations corresponding to the concave components 11. The bulging convex components 12A are formed in a hollow boss as shown in FIGS. 5 and 6. The bulging convex components 12A are formed by drawing on the bottom panel 1b of the rear frame 1. As shown in FIG. 4, the bulging convex components 12A of the rear frame 1 are fitted into the concave components 11 of the light guide plate 2 from below, respectively. Thus, the light guide plate 2 is positioned relative to the rear frame 1 such that it will not move in either the long or short side direction of the rear frame 1. As shown in FIGS. 5 and 6, each of the bulging convex components 12A is formed in a hollow, cylindrical boss with a cylindrical side face 22 and a spherical roof 24 (e.g., round roof). Each of the cylindrical side face 22 is a closed peripheral face that continuously extends from the bottom panel 1b without an opening next to the corresponding one of the bulging convex components 12A. The outside diameter of the bulging convex components 12A is substantially the same as the opening diameter of the concave components 11 of the light guide plate 2 along the short side direction of the light guide plate 2 (i.e., width between inside faces of the concave components 11 in the short side direction of the light guide plate 2). Thus, the cylindrical side faces 22 of the bulging convex components 12A contact the opposite inner faces 11a of the concave components 11, respectively, such that the light guide plate 2 is restricted to move in the short side direction relative to the rear frame 1 (e.g., a direction along an edge of the left or right end face 2b). The height of the bulging convex components 12A in a direction perpendicular to the long and short side directions is substantially the same as the thickness of the light guide plate 2 in the direction perpendicular to the long and short side directions. Therefore, these bulging convex components 12A fit smoothly into the concave components 11 of the light guide plate 2. The spherical roofs of the bulging convex components 12A do not stick up above the concave components 11. Furthermore, once the fitting is accomplished, the light guide plate 2 can be positioned without any looseness.

With the liquid crystal module L, the bulging convex components 12A in the form of hollow bosses are formed by drawing on the bottom panel 1b of the rear frame 1. In other words, the bulging convex components 12A have cylindrical outer peripheral surface extending from the bottom panel 1b, and are integrally formed with the rear frame 1 as a one-piece, unitary member. Thus, there are no holes made in the bottom panel 1b of the rear frame 1 as is the case when the rear frame is cut and lifted up to form positioning lift-up tabs. Therefore, there is no need to affix light blocking tape over the holes in the rear frame in order to prevent the leakage of light or the infiltration of dust as with a conventional liquid crystal module L. Therefore, there is no need for the light blocking tape or the work entailed by affixing it, and the cost can be reduced. Furthermore, the bulging convex components 12A can be easily formed by drawing. Also, the places where the concave components 11 are formed are closer to the LEDs 10a, i.e., near the lower end of the left and right end faces of the light guide plate 2. More specifically, the concave components 11 are located closer to the lower end face 2a than the upper end face opposite the lower end face 2a. Thus, even if the light guide plate 2 should expand due to heat from the LEDs 10a, the expansion on the lower end side from the concave components 11 of the light guide plate 2 will be very slight. Thus, the spacing between the LEDs 10a and the lower end face 2a of the light guide plate 2 can be maintained substantially constant. Accordingly, there is no risk that the light guide plate 2 will contact with the LEDs 10a and damage them during thermal expansion. Furthermore, since there is almost no change in the amount of light from the LEDs 10a to the light guide plate 2, the brightness can be kept substantially constant as well.

Figure 7:
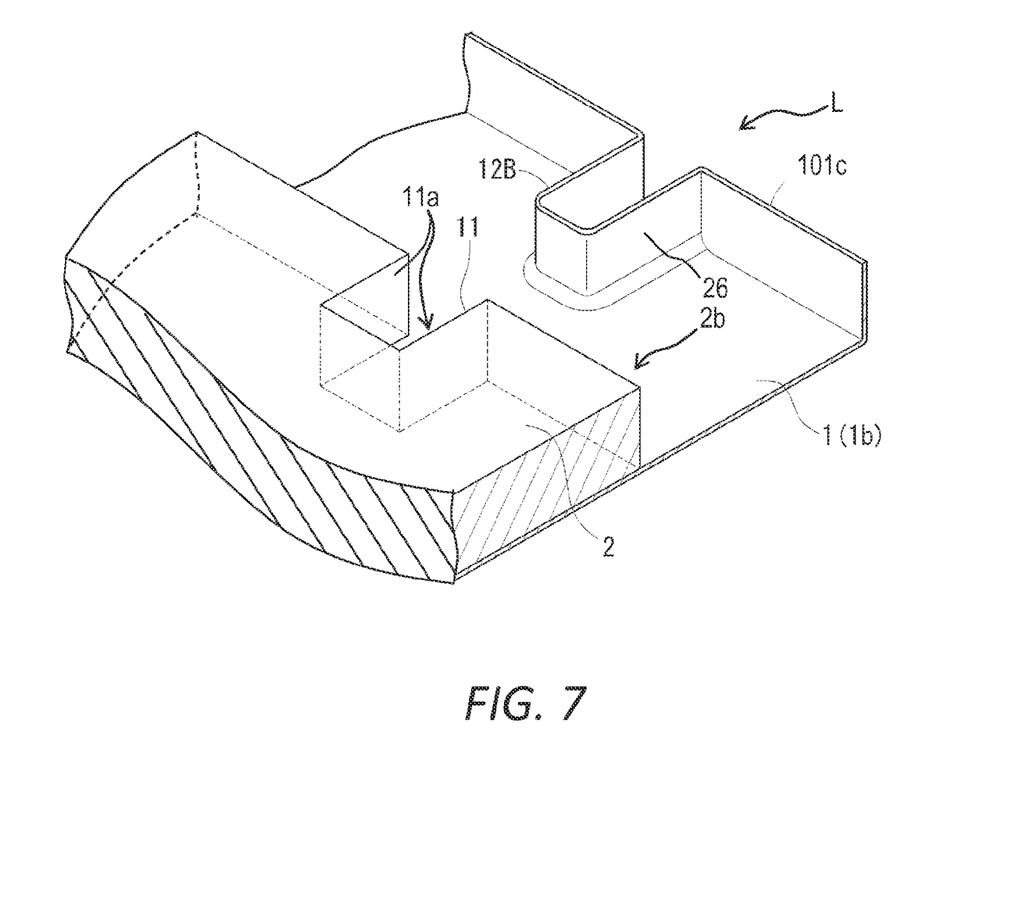
FIG. 7 is an enlarged, exploded perspective view of a positioning portion of a rear frame and a light guide plate of a liquid crystal module in accordance with a second embodiment.

Referring now to FIG. 7, a modified positioning portion of the liquid crystal module L in accordance with a second embodiment will now be explained.

In view of the similarity between the first and second embodiments, the parts of the second embodiment that are identical to the parts of the first embodiment will be given the same reference numerals as the parts of the first embodiment. In any event, the descriptions of the parts of the second embodiment that are substantially identical to the parts of the first embodiment may be omitted for the sake of brevity.

In the first embodiment, the concave components 11 are formed in the left and right end faces 2b of the light guide plate 2, and the bulging convex components 12A are formed by drawing in the form of hollow bosses on the bottom panel 1b of the rear frame 1. With the positioning portion of the liquid crystal module L in accordance with the second embodiment, as shown in FIG. 7, the positioning portion includes the concave components 11 (e.g., engagement portions) of the light guide plate 2 and a pair of U-shaped bulging convex components 12B (e.g., drawn protrusions). Each of the concave components 11 includes a substantially square cut-out with a pair of opposite inner faces 11a. The bulging convex components 12B protrude inwardly from left and right side panels 101c of the rear frame 1 (only the right side panel 101c is shown in FIG. 7). The bulging convex components 12B is formed by drawing the rear frame 1. Each of the bulging convex components 12B has a side wall 26 that continuously extends from respective one of the left and right side panels 101c and the bottom panel 1b without an opening next to the bulging convex components 12B. The bulging convex components 12B is fitted into the concave components 11 of the light guide plate 2. The light guide plate 2 is positioned relative to the rear frame 1 such that the light guide plate 2 will not move in either the long or short side direction of the rear frame 1. The U-shaped bulging convex components 12B preferably have a width in the short side direction of the rear frame 1. The width is substantially the same as the opening diameter of the concave components 11 of the light guide plate 2 along the short side direction of the light guide plate 2 (i.e., width between inside faces of each of the concave components 11 in the short side direction of the light guide plate 2). Thus, the side walls 26 of the bulging convex components 12B contact both the opposite inner faces of the concave components 11, respectively, such that the light guide plate 2 is restricted to move in the short side direction relative to the rear frame 1 (e.g., a direction along an edge of the left or right end face 2b). Furthermore, the bulging convex components 12B has a height that is substantially the same as the thickness of the tight guide plate 2 in the direction perpendicular to the long and short side directions. The bulging convex components 12B fit into the concave components 11 snugly such that they do not stick up above the concave components 11 of the light guide plate 2.

With the positioning portion shown in FIG. 7, the light guide plate 2 can again be positioned accurately, and there is no need to affix any light blocking tape. Thus, the cost can be reduced. Also, the external dimensions of the light guide plate 2 can be enlarged if the U-shaped bulging convex components 12B that protrude inward from the left and right side panels 101c of the rear frame 1 are designed to fit into the concave components 11 of the light guide plate 2. Furthermore, the bulging convex components 12B can be easily formed by drawing.

Figure 8:
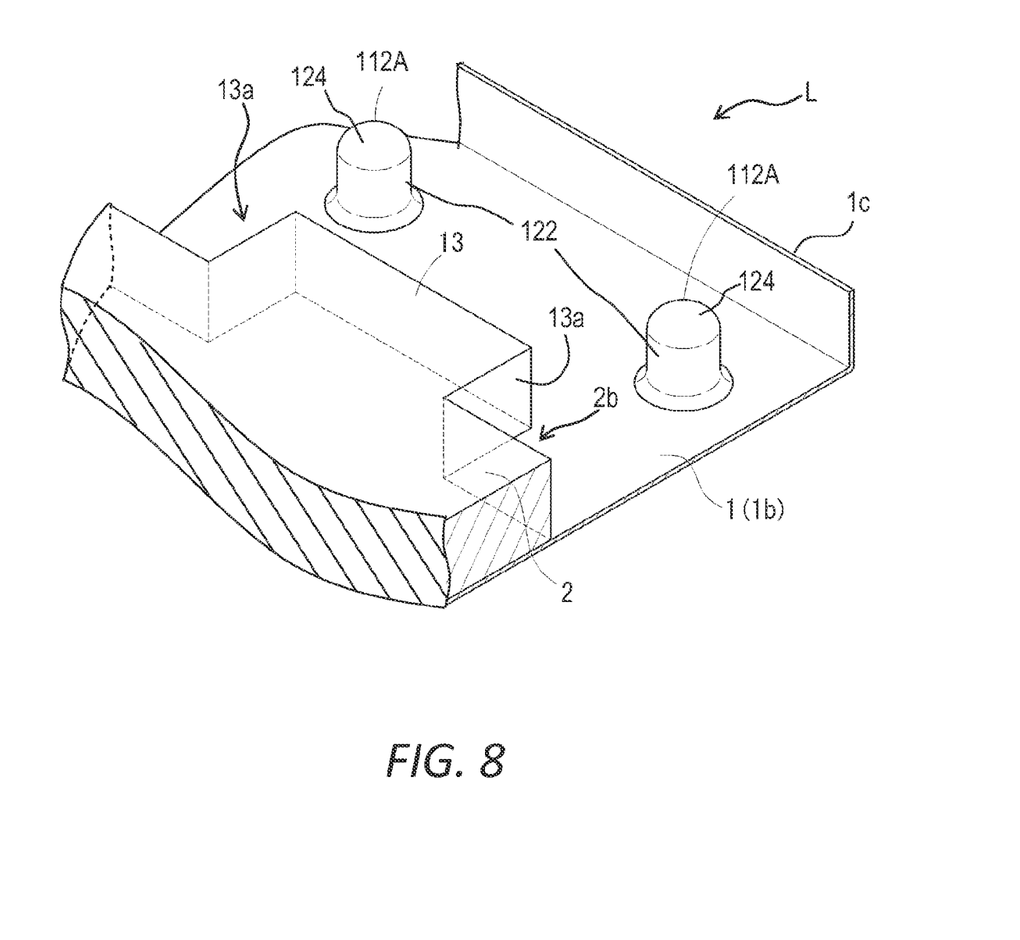
FIG. 8 is an enlarged, exploded perspective view of a positioning portion of a rear frame and a light guide plate of a liquid crystal module in accordance with a third embodiment.

Referring now to FIG. 8, a modified positioning portion of the liquid crystal module L in accordance with a third embodiment will now be explained.

In view of the similarity between the first and third embodiments, the parts of the third embodiment that are identical to the parts of the first embodiment will be given the same reference numerals as the parts of the first embodiment. In any event, the descriptions of the parts of the third embodiment that are substantially identical to the parts of the first embodiment may be omitted for the sake of brevity. With the positioning portion of the liquid crystal module L in accordance with the third embodiment, as shown in FIG. 8, the positioning portion includes a pair of rectangular convex components 13 (e.g., engagement portions or protruding components) and two pairs of bulging convex components 112A (e.g., drawn protrusion and additional drawn protrusion). The light guide plate 2 has the convex components 13, instead of having the concave components 11. The convex components 13 are provided on the left and right end faces 2b of the light guide plate 2, respectively. Each of the convex components 13 has a pair of opposite outer faces 13a. The pairs of bulging convex components 112A are provided on the bottom panel 1b of the rear frame 1 at locations corresponding to the convex components 13 such that each of the convex components 13 is sandwiched between the corresponding pair of the bulging convex components 112A. Each of the bulging convex components 112A is substantially identical to the bulging convex components 12A, and is formed in the shape of the hollow boss with a cylindrical side face 122 and a spherical roof 124 (e.g., round roof). Each of the cylindrical side face 122 is a closed peripheral face that continuously extends from the bottom panel 1b without an opening next to the corresponding one of the bulging convex components 112A. The bulging convex components 112A are formed by drawing on the bottom panel 1b of the rear frame 1. The convex components 13 are sandwiched from both sides by these pairs of bulging convex components 112A, thereby positioning the light guide plate 2. Specifically, the cylindrical side faces 122 of the bulging convex components 112A contact the opposite outer faces 13a, respectively, such that the light guide plate 2 is restricted to move in the short side direction relative to the rear frame 1 (e.g., a direction along an edge of the second end face 2b). In these cases, the width of the convex components 13 of the light guide plate 2 in the short side direction of the light guide plate 2 is set to be substantially the same as the spacing between the bulging convex components 112A in the short side direction of the light guide plate 2.

With the positioning portion shown in FIG. 8, the light guide plate 2 can again be positioned accurately, and there is no need to affix any light blocking tape. Thus, the cost can be reduced. Furthermore, the bulging convex components 112A can be easily formed by drawing.

Figure 9:
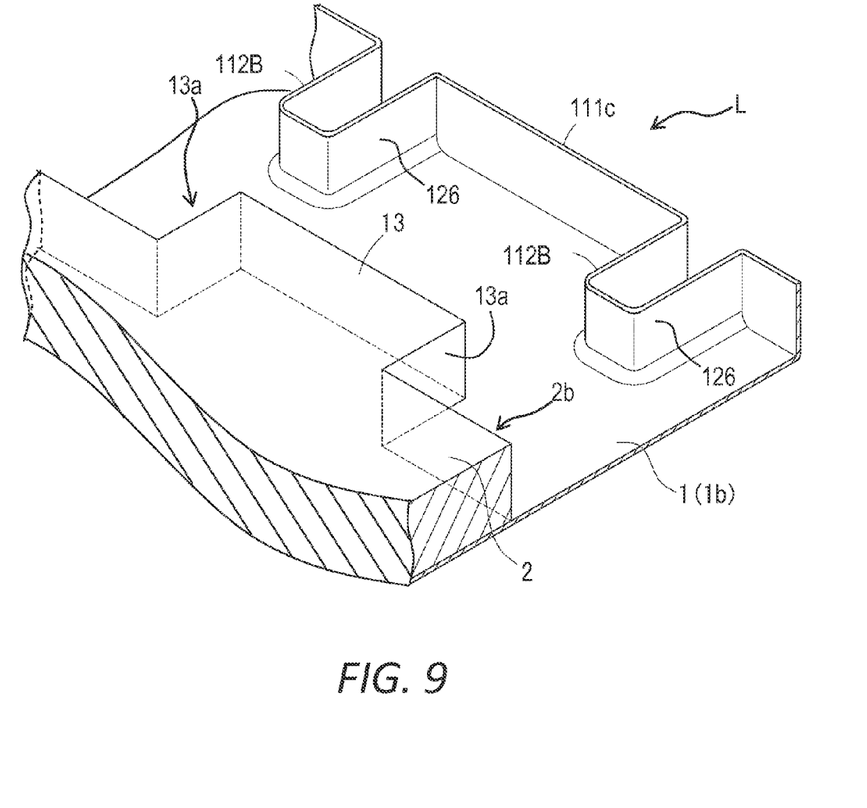
FIG. 9 is an enlarged, exploded perspective view of a positioning portion of a rear frame and a light guide plate of a liquid crystal module in accordance with a fourth embodiment.

Referring now to FIG. 9, a modified positioning portion of the liquid crystal module L in accordance with a fourth embodiment will now be explained.

In view of the similarity between the first and fourth embodiments, the parts of the fourth embodiment that are identical to the parts of the first embodiment will be given the same reference numerals as the parts of the first embodiment. In any vent, the descriptions of the parts of the fourth embodiment that are substantially identical to the parts of the first embodiment may be omitted for the sake of brevity.

With the positioning portion of the liquid crystal module L in accordance with the fourth embodiment, as shown in FIG. 9, the positioning portion includes a pair of rectangular convex components 13 (e.g., engagement portions or protruding components) and two pairs of U-shaped bulging convex components 112B (e.g., drawn protrusion and additional drawn protrusion). The light guide plate 2 has the convex components 13, instead of having the concave components 11. The convex components 13 are provided on the left and right end faces 2b of the light guide plate 2, respectively. Each of the convex components 13 has a pair of opposite outer faces 13a. The pairs of bulging convex components 112B are provided on the left and right side panels 111c of the rear frame 1 at locations corresponding to the convex components 13 such that each of the convex components 13 is sandwiched between the corresponding pair of the bulging convex components 112B. The bulging convex components 112B protrude inwardly from the left and right side panels 111c of the rear frame 1. Each of the bulging convex components 112B is substantially identical to the bulging convex components 12B. The bulging convex components 112B are formed by drawing on the left and right side panels 111c of the rear frame 1. Each of the bulging convex components lit 2B has a side wall 126 that continuously extends from respective one of the left and right side panels 111c and the bottom panel 1b without an opening next to the bulging convex components 112B. The convex components 13 are sandwiched from both sides by these pairs of bulging convex components 112B, thereby positioning the light guide plate 2. In these cases, the width of the convex components 13 of the light guide plate 2 in the short side direction of the light guide plate 2 is set to be substantially the same as the spacing between the bulging convex components 112B in the short side direction of the light guide plate 2. Thus, the side walls 26 of the bulging convex components 112B contact the opposite outer faces 13a, respectively, such that the light guide plate 2 is restricted to move in the short side direction relative to the rear frame 1 (e.g., a direction along an edge of the left or right end face 2b).

With the positioning portion shown in FIG. 9, the light guide plate 2 can again be positioned accurately, and there is no need to affix any light blocking tape. Thus, the cost can be reduced. Also, when the convex components 13 of the light guide plate 2 are sandwiched from both sides by the pairs of U-shaped bulging convex components 112B that protrude inward from the left and right side panels 111c of the rear frame 1, an advantage is that the external dimensions of the tight guide plate 2 can be enlarged. Furthermore, the bulging convex components 112B can be easily formed by drawing.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A liquid crystal module comprising:
   a rear frame made of sheet metal;
   a molded frame provided around the rear frame, the molded frame having a panel support component;
   a light guide plate provided within the rear frame, the light guide plate having first, second and third end faces, with the third end face being opposite the first end face such that the second end face extends between the first end face and the third end face, the second end face being shorter than each of the first and third end faces;
   a light source disposed only along the first end face of the light guide plate;
   a liquid crystal panel supported to the panel support component of the molded frame; and
   a positioning structure positioning the light guide plate relative to the rear frame, the positioning structure having an engagement portion and a protrusion that engages with the engagement portion, the engagement portion being provided on the second end face of the light guide plate with the second end face being different from the first end face, the protrusion being provided on the rear frame by drawing a part of the rear frame with the protrusion being integrally formed with the rear frame as a one-piece, unitary member, the protrusion having an extended portion that continuously extends from the rear frame, the extended portion at least partially contacting the engagement portion, the extended portion defining a hollow interior space therewithin, the protrusion engaging with the engagement portion only at a single location on the second end face of the light guide plate, with the single location being closer to the first end face of the light guide plate than to the third end face of the light guide plate such that a positional deviation of the first end face is smaller than that of the third end face while the light guide plate expands due to heat from the light source.

2. The liquid crystal module according to claim 1, wherein
the engagement portion includes a notch that is provided on the second end face of the light guide plate, and
the protrusion is provided on a bottom panel of the rear frame by drawing the bottom panel of the rear frame, the extended portion continuously extending from the bottom panel of the rear frame, the protrusion being fitted into the notch.

3. The liquid crystal module according to claim 2, wherein
the extended portion of the protrusion has a closed peripheral face that continuously extends from the bottom panel of the rear frame without an opening next to the protrusion.

4. The liquid crystal module according to claim 2, wherein
the extended portion of the protrusion has a cylindrical side face with a round roof.

5. The liquid crystal module according to claim 2, wherein
the notch has a pair of opposite inner faces, the extended portion of the protrusion contacting both the opposite inner faces such that the light guide plate is restricted to move in a direction along an edge of the second end face of the light guide plate relative to the rear frame.

6. The liquid crystal module according to claim 1, wherein
the engagement portion includes a notch that is provided on the second end face of the light guide plate, and
the protrusion is provided on a side panel of the rear frame by drawing the side panel of the rear frame, the extended portion continuously extending from the side panel of the rear frame, the protrusion being fitted into the notch.

7. The liquid crystal module according to claim 6, wherein
the extended portion of the protrusion has a side wall that continuously extends from the side panel and further from a bottom panel of the rear frame without an opening next to the protrusion.

8. The liquid crystal module according to claim 6, wherein
the notch has a pair of opposite inner faces, the extended portion of the protrusion contacting both the opposite inner faces such that the light guide plate is restricted to move in a direction along an edge of the second end face of the light guide plate relative to the rear frame.

9. The liquid crystal module according to claim 1, wherein
the engagement portion includes a protruding component that is provided on the second end face of the light guide plate, and
the positioning structure further includes an additional protrusion that engages with the engagement portion, the extended portion of the protrusion and the additional protrusion being provided on a bottom panel of the rear frame by drawing the bottom panel of the rear frame, the extended portion of the protrusion continuously extending from the bottom panel of the rear frame, the protruding component being fitted between the protrusion and the additional protrusion.

10. The liquid crystal module according to claim 9, wherein
the extended portion of the protrusion and the additional protrusion have closed peripheral faces that continuously extend from the bottom panel of the rear frame without an opening next to the protrusion and the additional protrusion.

11. The liquid crystal module according to claim 9, wherein
the extended portion of the protrusion and the additional protrusion have a cylindrical side face with a round roof.

12. The liquid crystal module according to claim 9, wherein
the protruding component has a pair of opposite outer faces, the extended portion of the protrusion and the additional protrusion contacting the opposite outer faces, respectively, such that the light guide plate is restricted to move in a direction along an edge of the second end face of the light guide plate relative to the rear frame.

13. The liquid crystal module according to claim 1, wherein
the engagement portion includes a protruding component that is provided on the second end face of the light guide plate, and
the positioning structure further includes an additional protrusion that engages with the engagement portion, the extended portion of the protrusion and the additional protrusion being provided on a side panel of the rear frame by drawing the side panel of the rear frame, the extended portion continuously extending from the side panel of the rear frame, the protruding component being fitted between the protrusion and the additional protrusion.

14. The liquid crystal module according to claim 13, wherein
the extended portion of the protrusion and the additional protrusion have side walls that continuously extend from the side panel and a bottom panel of the rear frame without an opening next to the protrusion and the additional protrusion.

15. The liquid crystal module according to claim 13, wherein
the protruding component has a pair of opposite outer faces, the extended portion of the protrusion and the additional protrusion contacting the opposite outer faces, respectively, such that the light guide plate is restricted to move in a direction along an edge of the second end face of the light guide plate relative to the rear frame.

16. The liquid crystal module according to claim 1, wherein
the molded frame has first and second contacting portions contacting a front surface of the light guide plate to support the light guide plate toward the rear frame,
the first contacting portion is arranged to contact an edge of the front surface, which is defined by the front surface and the first end face, and
the second contacting portion is arranged to contact at an inner location of the front surface relative to the third end face.

17. A liquid crystal module comprising:
a rear frame made of sheet metal;
a light guide plate provided within the rear frame, the light guide plate having first, second and third end faces, with the third end face being opposite the first end face such that the second end face extends between the first end face and the third end face, the second end face being shorter than each of the first and third end faces;

a light source disposed only along the first end face of the light guide plate;

a liquid crystal panel disposed on a front side of the liquid crystal module relative to the light guide plate; and a positioning structure positioning the light guide plate relative to the rear frame, the positioning structure having an engagement portion and a protrusion that engages with the engagement portion, the engagement portion being provided on the second end face of the light guide plate with the second end face being different from the first end face, the protrusion being provided on the rear frame with the protrusion being integrally formed with the rear frame, the protrusion engaging with the engagement portion only at a single location on the second end face of the light guide plate, with the single location being closer to the first end face of the light guide plate than to the third end face of the light guide plate.

18. The liquid crystal module according to claim 17, further comprising:

an additional positioning structure positioning the light guide plate relative to the rear frame, the additional positioning structure having an additional engagement portion and an additional protrusion that engages with the additional engagement portion, the additional engagement portion being provided on a fourth end face of the light guide plate with the fourth end face being opposite the second end face, the additional protrusion being provided on the rear frame with the additional protrusion being integrally formed with the rear frame, the positioning structure and the additional positioning structure being equally spaced apart from the first end face of the light guide plate.

19. The liquid crystal module according to claim 18, wherein the additional protrusion engages with the additional engagement portion at a single location on the fourth end face of the light guide plate, with the single location being closer to the first end face of the light guide plate than to the third end face of the light guide plate.

20. The liquid crystal module according to claim 19, wherein the single locations on the second and fourth end faces of the light guide plate are closer to the first end face of the light guide plate than to the third end face of the light guide plate such that a positional deviation of the first end face is smaller than that of the third end face while the light guide plate expands due to heat from the light source.

* * * * *